United States Patent
Komatsu et al.

(10) Patent No.: US 8,077,320 B2
(45) Date of Patent: Dec. 13, 2011

(54) WAVEFRONT MEASURING METHOD AND WAVEFRONT MEASURING APPARATUS USING THE WAVEFRONT MEASURING METHOD

(75) Inventors: Satoru Komatsu, Utsunomiya (JP); Yasuhiro Sawada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 12/419,910

(22) Filed: Apr. 7, 2009

(65) Prior Publication Data
US 2009/0257068 A1    Oct. 15, 2009

(30) Foreign Application Priority Data

Apr. 9, 2008    (JP) ................... 2008-101394

(51) Int. Cl.
*G01B 9/02*    (2006.01)
(52) U.S. Cl. .......... 356/450; 382/191; 382/207
(58) Field of Classification Search .......... 382/106, 382/191, 205, 207, 283; 356/450
See application file for complete search history.

(56) References Cited

U.S. PATENT DOCUMENTS

| | | | | |
|---|---|---|---|---|
| 5,185,810 A | * | 2/1993 | Freischlad | 382/100 |
| 6,859,566 B2 | * | 2/2005 | Sun | 382/283 |
| 7,044,602 B2 | * | 5/2006 | Chernyak | 351/208 |

FOREIGN PATENT DOCUMENTS

JP    3423486 B    7/2003

OTHER PUBLICATIONS

Ghiglia Pritt Two-Dimensional Phase Unwrapping Theory, Algorithms, and Software.

* cited by examiner

*Primary Examiner* — Tarifur Chowdhury
*Assistant Examiner* — Jonathon Cook

(57) ABSTRACT

A wavefront measuring method includes steps of:
obtaining a first transmitted-wavefront from a first image formed by transmitting beam through a substance at a first angle; obtaining a second image formed by transmitting the beam through the substance at a second angle; formulating a mask corresponding to an interference degree of the second image; converting the first transmitted-wavefront to match with a temporary second transmitted-wavefront from the second image; and unwrapping from the second image, the mask, and a converted first transmitted-wavefront to obtain a second transmitted-wavefront by transmitting the beam through the substance at the second angle.

10 Claims, 9 Drawing Sheets

OPTICAL AXIS
PROJECTED DIRECTION

INDISTINCT AREA

WAVEFRONT MEASURING METHOD AND WAVEFRONT MEASURING APPARATUS USING THE WAVEFRONT MEASURING METHOD

BACKGROUND OF THE INVENTION

1. Field of the Invention

The present invention relates to a wavefront measuring method for unwrapping a two-dimensional phase image measured in interference measurement and a wavefront measuring apparatus using the wave front measuring method, which are primarily suitable to evaluate optical characteristics of an optical element.

2. Description of the Related Art

Conventionally, interference measurement has been performed to evaluate optical characteristics, such as surface shape and uniformity of an internal medium, of an optical element, such as a lens and a filter. In the interference measurement, an inspected wave (inspected light) transmitted through an inspected substance, such as an optical element, and a reference wave (reference light) as a standard are interfered to form four types of interference fringes as shown in FIG. 15A.

A two-dimensional phase image shown in FIG. 15B is calculated from interference fringe images, and unwrapping is performed to obtain an aberration of the inspected substance as a transmitted wavefront as shown in FIG. 15C.

Methods for calculating the two-dimensional phase image from the interference fringe images include a Fourier transform method and a fringe scanning method. Both methods include calculation of arctangent in the course of the methods, and the phases that are normally consecutive become wrapped phases in the range of $-\pi$ to $\pi$ due to the range of arctangent. The act of obtaining the normal consecutive phases (transmitted wavefront) from the wrapped phases is called unwrapping.

Various unwrapping methods are created based on the assumption that the normal phase change is basically smooth as described in Ghiglia Pritt Two-Dimensional Phase Unwrapping Theory, Algorithms, and Software (hereinafter, "Document 1") and Japanese Patent No. 03423486 (hereinafter "Document 2").

Document 1 describes methods dependent on the path, such as a Branch Cut algorithm, a Quality-Guided Path Following algorithm, a Mask Cut algorithm, and a Minimum Discontinuity algorithm, as methods for unwrapping from the wrapped phases. Document 1 also describes methods not dependent on the path, such as an Unweighted Least Squares algorithm, a Weighted Least Squares algorithm, and a General Minimum $L^P$-Norm algorithm.

Document 2 describes a method of calculating a transmitted wavefront not from the wrapped phases, but from interference fringes. In this method, the inspected substance is rotated to count the changes in tone of the interference fringe points to thereby obtain phase changes from initial angles at each angle to calculate the transmitted wavefront.

However, in some cases, the number of interference fringes increase and the interference fringes become indistinct, so that the interference fringes cannot be resolved. If a two-dimensional phase image is calculated from an interference fringe image in which the indistinct interference fringes are photographed, the area with a $2\pi$ phase difference also becomes indistinct, so that unwrapping becomes difficult. In the conventional methods, unwrapping is performed by avoiding the indistinct area, or the indistinct area is interpolated by computation. Therefore, in some cases, the transmitted wavefront of the indistinct area cannot be calculated and falls off, and the reliability of the optical characteristic measurement of the optical element is reduced.

SUMMARY OF THE INVENTION

A wavefront measuring method of the present invention comprises: a first obtaining step for obtaining a first transmitted wavefront based on a first interference fringe image formed by a transmitted light beam when a light beam is made incident into an inspected substance at a first angle; a second obtaining step for obtaining a second interference fringe image formed by a transmitted light beam when a light beam is made incident into the inspected substance at a second angle different from the first angle; a mask generating step for generating a mask corresponding to an interference degree of the second interference fringe image; a converting step for converting the first transmitted wavefront to match with a temporary second transmitted wavefront obtained based on the second interference fringe image; and an unwrapping step for unwrapping based on the second interference fringe image, the mask, and the first transmitted wavefront converted in the converting step to obtain a second transmitted wavefront by a light beam transmitted through the inspected substance when a light beam is made incident into the inspected substance at the second angle.

Further features of the present invention will become apparent from the following description of exemplary embodiments with reference to the attached drawings.

DESCRIPTION OF THE EMBODIMENTS

Figure 1:
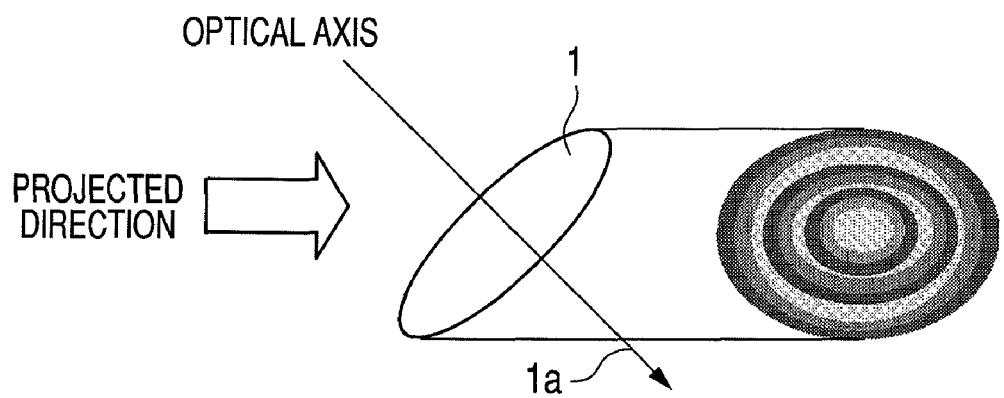
FIG. 1 is an explanatory view of projection other than toward an optical axis of an inspected substance.
Figure 2:
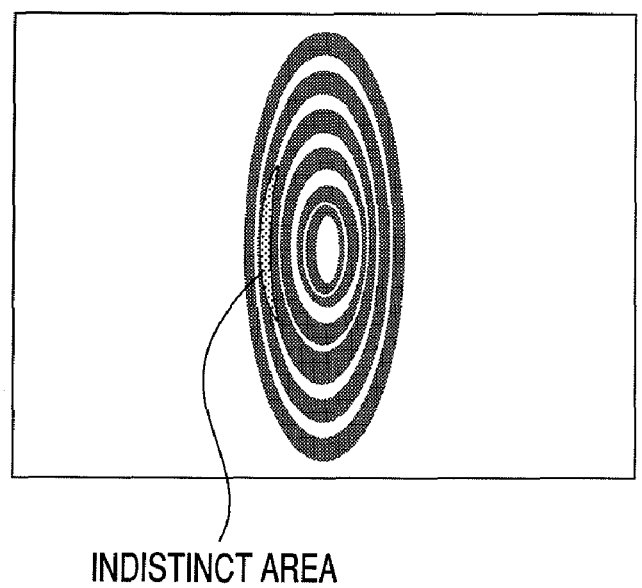
FIG. 2 is a schematic diagram of interference fringes with an indistinct area in interference fringes based on a light beam through the inspected substance.

A wavefront measuring method of the present invention is based on the assumption that not only are optical characteristics of an inspected substance (optical element) obtained in an optical axis, but also a transmitted wavefront of an optical element 1 is obtained in (a plurality of) directions (such as in FIG. 1) different from an optical axis 1a. FIG. 2 is a schematic diagram of interference fringes in a direction in which the convex lens (positive lens) is rotated for $\pi/2$ around the axis perpendicular to the optical axis.

In such a case, the phase difference between the inspected light and the reference light is large, and as described above, the number of interference fringes increases and the interference fringes become indistinct. Therefore, the interference fringes may not be resolved (image with low reliability interference fringes is obtained). If a two-dimensional phase image is calculated from interference fringe images, in which the indistinct interference fringes are photographed, the area with a $2\pi$ phase difference also becomes indistinct, and the unwrapping becomes difficult.

Thus, the present invention provides a wavefront measuring method that can accurately calculate a transmitted wavefront of an indistinct area even if there is an indistinct area in interference fringes obtained through an optical element, a wavefront measuring apparatus using the wavefront measuring method, and a storage medium capable of executing the wavefront measuring method.

The wavefront measuring method of the present invention will now be described with reference to the appended drawings. The same reference numerals in FIGS. indicate the same members.

First Embodiment

The wavefront measuring method of the present invention for calculating a transmitted wavefront of a light beam transmitted through an inspected substance includes the following steps.

A phase calculating step (obtaining step) will be described first. When there is an indistinct area (area that cannot be resolved, low contrast area, or low visibility area) in interference fringes obtained from a light beam transmitted through an inspected substance, the incident angle of the light beam into the inspected substance will be referred to as a first angle. A step of calculating (obtaining) a two-dimensional phase image or a transmitted wavefront based on the interference fringe (first interference fringe image) obtained from the transmitted light beam when the light beam is made incident into the inspected substance at the first angle will be referred to as a phase calculating step (obtaining step).

A mask generating step will be described next. A step of generating a mask from the two-dimensional phase image calculated in the phase calculating step based on the difference in the interference degree will be referred to as a mask generating step. Details will now be described. In an area that can be accurately resolved and in which high contrast interference fringes are obtained in obtaining interference fringes an accurate two-dimensional phase image (image of FIG. 15B) and a transmitted wavefront (image of FIG. 15C) can be obtained. However, in an area that cannot be resolved (the indistinct area) because the interference fringes are too small (period of the interference fringes is too short or the interference fringes are too fine), an accurate two-dimensional image cannot be obtained. Therefore, the area that cannot be resolved because the interference fringes are too small (or area with low resolution compared to other areas, or area with too high interference degree compared to other areas) is masked, and in a subsequent step, a process of obtaining interference fringes, a two-dimensional phase image, or a transmitted wavefront is executed. A step of generating the mask for this purpose will be referred to as a mask generating step.

Thirdly, a wavefront converting step (converting step) will be described. A light beam is made incident into the inspected substance at a second angle different from the first angle, and based on the transmitted light beam, interference fringe images, and a two-dimensional phase image or a transmitted wavefront based on the interference fringe images are obtained. A step of converting the interference fringe images, the two-dimensional phase image, or the transmitted wavefront to make them match with the interference fringe images, the two-dimensional phase image (temporary two-dimensional phase image), or the transmitted wavefront (temporary transmitted wavefront) obtained when the light is made incident into the inspected substance at the first angle will be referred to as a wavefront converting step.

Fourthly, an unwrapping step will be described. A step of performing unwrapping based on the two-dimensional phase image calculated in the phase calculating step, the mask formulated or generated in the mask generating step, and the data obtained in the wavefront converting step will be referred to as an unwrapping step.

In the wavefront measuring method of the present invention, the steps are used to accurately calculate and measure the transmitted wavefront of the inspected substance.

In the wavefront measuring apparatus of the present invention, the wavefront measuring method is used to measure the transmitted wavefront of the inspected substance.

Furthermore, a program of the present invention causes a computer to execute the wavefront measuring method.

Figure 3:
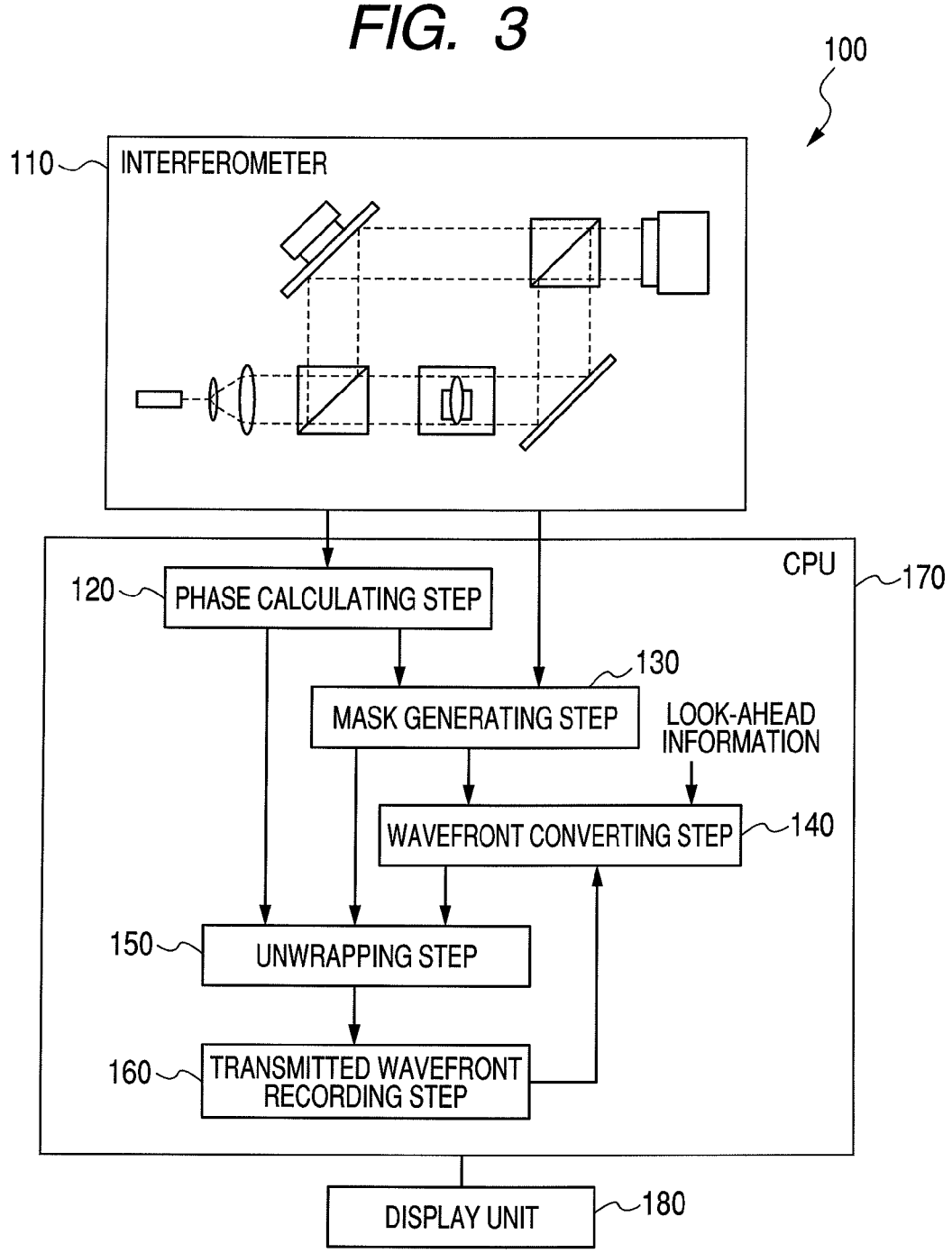
FIG. 3 is an explanatory view of a wavefront measuring method of a first embodiment according to the present invention.

FIG. 3 is a schematic view of main parts of one mode of the wavefront measuring method and the wavefront measuring apparatus using the wavefront measuring method according to the first embodiment of the present invention. The wavefront measuring apparatus of the first embodiment includes an interferometer 110, a computation apparatus 170, and a display unit 180. The computation apparatus 170 executes a computation process according to a program in which the wavefront measuring method of the present invention is created.

In the wavefront measuring method executed in the computation apparatus 170, a phase calculating step (phase calculating unit) 120, a mask generating step (mask generating unit) 130, a wavefront converting step (wavefront converting unit) 140, an unwrapping step (unwrapping unit) 150, and a transmitted wavefront recording step (transmitted wavefront recording unit) 160 are used.

The wavefront measuring apparatus is constituted by programs (components or units) for executing the steps. In the configuration, data can be mutually transmitted and received through, for example, a bus interface. The procedures in the computation apparatus 170 are stored in advance as a program in a storage device in a computer, and the programs are read to execute the procedures. The configurations may be implemented on a single computer or on a plurality of computers when the configurations are implemented as computer programs. The constituent units may also be circuits.

In the present embodiment, a wavefront measuring method (wavefront measuring apparatus 100) including interference fringe image measuring step and the phase calculating step 120 by the interferometer 110 as constituent elements will be described.

In another configuration of the present embodiment, the interference fringe image measuring step and the phase calculating step 120 by the interferometer 110 may be arranged as a method separate from the wavefront measuring method, and a transmitted wavefront may be calculated from a two-dimensional phase image.

In that case, the wavefront measuring method may be able to read (input) the two-dimensional phase image that is acquired and processed in the interference fringe image measuring step and the phase calculating step as a method separate from the wavefront measuring method and that is stored in a recording medium such as a semiconductor memory and a magnetic/optical disk. In another configuration, reading of the two-dimensional phase image through the recording medium and direct reading of the two-dimensional phase image from the interference fringe image measuring step and the phase calculating step 120 may be possible.

Furthermore, although a wavefront measuring method including the transmitted wavefront recording step 160 as a constituent element will be described in the present embodiment, the transmitted wavefront recording step 160 may be a method separate from the wavefront measuring method 100.

Figure 4:
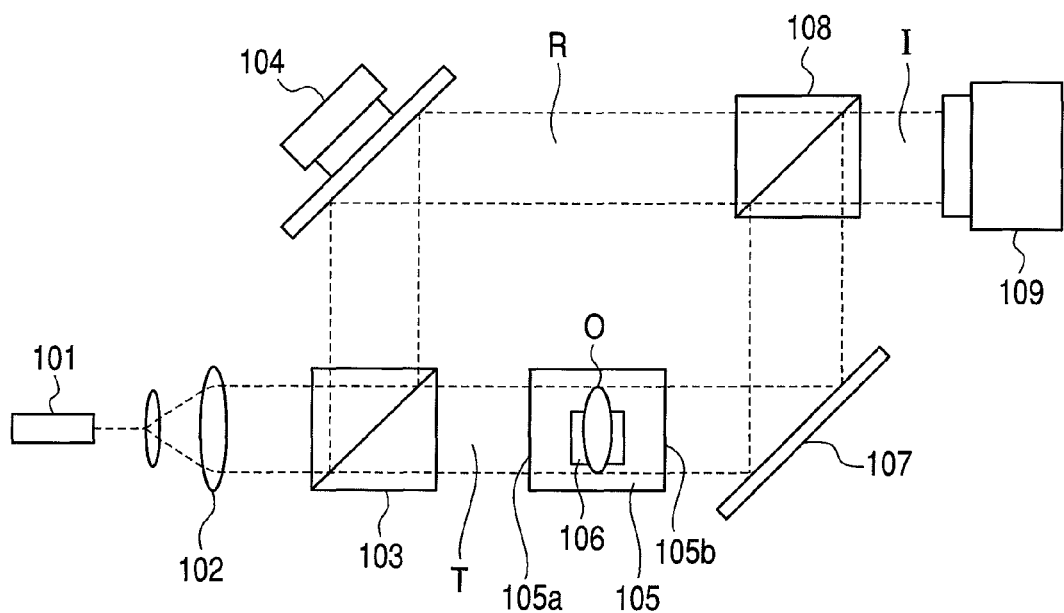
FIG. 4 is an explanatory view of an interferometer used in the first embodiment according to the present invention.

FIG. 4 is an explanatory view of the interferometer 110 of FIG. 3. The interferometer 110 can observe interference fringes from different light directions relative to the inspected substance O.

The interferometer 110 shown in FIG. 4 includes a laser light source 101 that emits coherent light, a beam expander 102 that expands the radius of the laser light from the laser light source 101, and a beam splitter 103 that splits the light beam from the beam expander 102 into transmitted light and reference light.

The interferometer 110 also includes a piezo mirror 104 that changes the optical path length of the reference light in a sub-wavelength order. The interferometer 110 further includes a matching tank 105 that holds an inspected substance O soaked in a matching solution and a stage 106 that fixes the inspected substance O in the matching tank 105. The interferometer 110 also includes a mirror 107 that reflects the light beam transmitted through the matching tank 105, a beam splitter 108 that superimposes transmitted light T and reference light R, and an image pickup apparatus 109 that receives the light (interference light) I superimposed by the beam splitter 108.

Although FIG. 4 illustrates the inspected substance O for description, the inspected substance O is not a constituent element of the wavefront measuring apparatus.

To start measuring the transmitted wavefront, the inspected substance O is placed on the stage 106 in the matching tank 105, and inside the matching tank 105 is filled with a liquid (matching solution) having approximately the same refractive index as the inspected substance O. The orientation of the inspected substance O placed on the stage 106 is changed, and the image pickup apparatus 109 photographs interference fringes in a desired light direction (another angle) to the inspected substance O around the axis perpendicular to the optical axis in the case of a lens for example, the light direction being a direction in which the interference fringes are not indistinct.

Light entering/exiting parts 105a and 105b in the matching tank 105 are transparent parallel plates and filled with a matching solution having approximately the same refractive index as the inspected substance O. Therefore, the transmitted light transmits through the matching tank 105 with almost no refraction.

However, if the refractive index is nonuniform and fluctuated inside the inspected substance O, the difference in the optical path length is accumulated in the light direction, and the wavefront of the light emitted from the matching tank 105 is disordered.

The disordered inspected light is superimposed with the reference light, and the interference fringes appear on the cross-sectional strength of the superimposed light. The image pickup apparatus 109 measures the interference fringes.

Figure 15A:
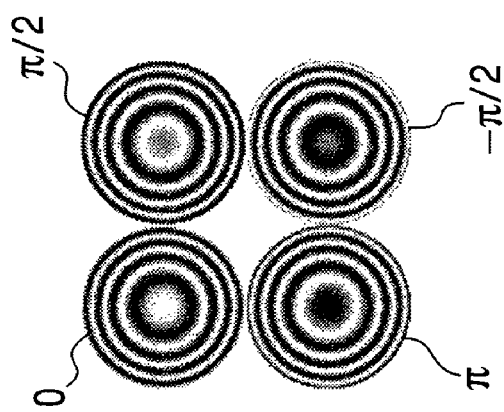
FIGS. 15A, 15B and 15C are explanatory views of interference fringe images obtained by an interferometer.
Figure 15B:
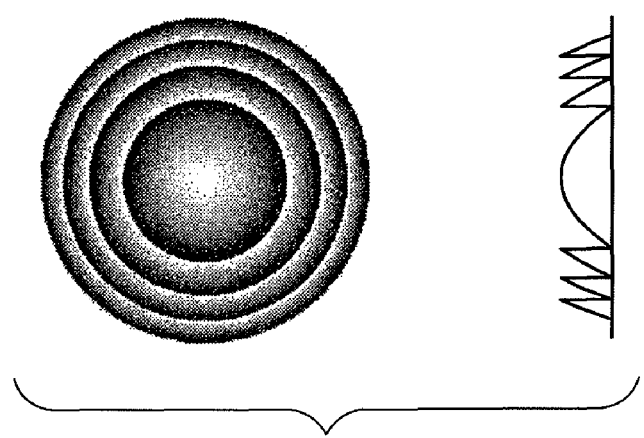
Figure 15C:
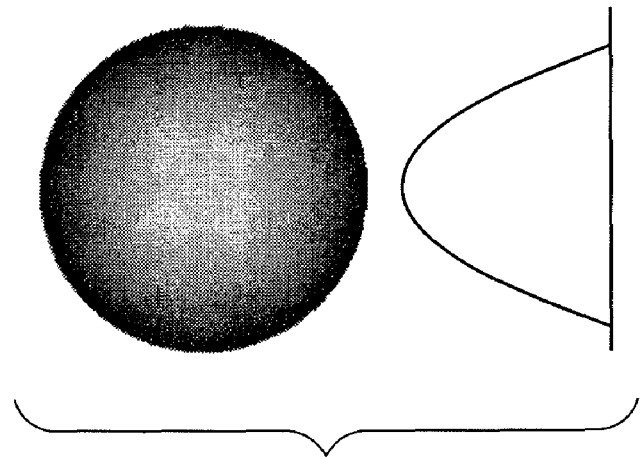

In the phase calculating step 120, a two-dimensional phase image as shown in FIGS. 15A to 15C is formulated by a fringe scanning method based on the interference fringe images measured by the interferometer 110. Another method, such as a Fourier transform method, may also be used as a formulating method of the two-dimensional phase image.

In the mask generating step 130, an area with low interference degree is detected (may be extracted or removed) from the measured interference fringe images, and a mask is generated that determines the detected area to be unnecessary and the area with high interference degree other than the detected area to be effective. In the detection of the area with low interference degree, a partial phase image may be extracted from the two-dimensional phase image (or remaining phase image may be removed), or a partially transmitted wavefront may be extracted from the transmitted wavefront (or remaining transmitted wavefront may be removed). Details of the method will be described below.

In the wavefront converting step 140, a transmitted wavefront of the unnecessary area of the mask generated in the mask generating step 130 is extracted from the transmitted wavefront measured at an incident angle (second angle) of the light beam, in which the interference fringes are distinct, other than an incident angle (first angle) of the light beam, in which the interference fringes are indistinct. Look-ahead information is used to make a conversion so as to match with the transmitted wavefront obtained from the light beam made incident at the first angle. Details of the method will be described below.

In the unwrapping step 150, the two-dimensional phase image calculated in the phase calculating step 120, the mask generated in the mask generating step 130, and the transmitted wavefront at the second angle obtained in the wavefront converting step 140 are used to perform unwrapping to calculate the transmitted wavefront. Details of the method will be described below.

In the transmitted wavefront recording step 160, the transmitted wavefront obtained in the unwrapping step 150 is stored in various recording media.

More detailed operations of various constituent elements of the wavefront measuring method and the wavefront measuring apparatus 100 using the wavefront measuring method will now be described.

In the interference fringe measurement by the interferometer 110 of FIG. 4, the inspected substance O is placed on the stage 106 of the interferometer 110, the piezo mirror 104 is driven, the image pickup apparatus 109 photographs the interference fringes in a plurality of different reference light phases $\theta_i$ and the interference fringe images are recorded.

How many reference light phases will be used depends on the processing method of the phase calculating step 120. In the present embodiment, the image is picked up in four reference light phases $\{\theta_1, \theta_2, \theta_3, \theta_4\} = \{0, \pi/2, \pi, -\pi/2\}$.

In the wavefront measuring method of the present embodiment, the two-dimensional phase image or the transmitted wavefront at another angle, in which there is no indistinct area in the interference fringes, is used to obtain the transmitted wavefront at a desired angle.

Therefore, the inspected substance O needs to be rotated around the axis perpendicular to the optical axis before photographing. In that case, the two-dimensional phase image or the transmitted wavefront at an angle close to the angle is desired. Therefore, if there is an indistinct area in the interference fringes at an angle close to the first angle, there is a need to calculate the transmitted wavefront at the second angle, in which there is no indistinct area, finely change the angle, and sequentially calculate the transmitted wavefront to obtain the transmitted wavefront that can be obtained from the light beam made incident at an angle close to the first angle.

Figure 5:
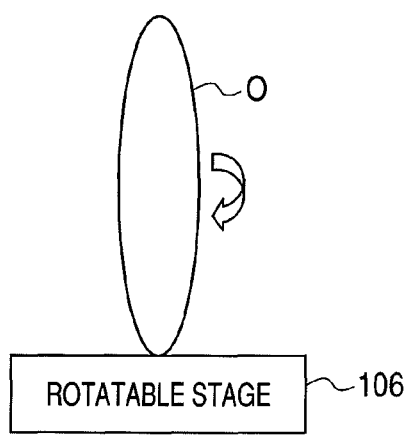
FIG. 5 is an explanatory view of a rotatable stage.

The angle at which the inspected substance O is fixed on the stage 106 can be changed to measure from a plurality of directions. A rotatable mechanism may also be arranged on the stage 106 as shown in FIG. 5 for more accurate and easy measurement.

Interference fringe images F photographed this way is output to the phase calculating step 120 and the mask generating step 130.

In the phase calculating step 120, the interference fringe images F are received from the interferometer 110 to calculate a two-dimensional phase image P, and the calculated two-dimensional phase image P is output to the mask generating step 130 and the unwrapping step 150.

In the phase calculating step 120, a group of interference fringe images F with different reference light phases $\theta_i$ at the angle are first extracted. The present embodiment includes four images $\{F_1=F(0), F_2=F(\pi/2), F_3=3(\pi), F_4=F(-\pi/2)\}$ of $\{\theta_1, \theta_2, \theta_3, \theta_4\}=\{0, \pi/2, \pi, -\pi/2\}$, and from the group of images, based on a formula $$P = \left\{\tan^{-1}\left(\frac{F_4 - F_2}{F_1 - F_3}\right)\right\} \qquad \text{[Formula 1]}$$

the two-dimensional phase image $P(\theta_i)$, where $-\pi \leq P(\theta_i) < \pi$, is formulated. In the formula, the range of $\tan^{-1}$ is $[0, \pi]$.

In the two-dimensional phase image P obtained this way, the phase may skip from near $+\pi$ to near $-\pi$ in adjacent pixels in the area that normally successively changes. This phenomenon is called wrapping.

In the phase calculating step 120, the calculated two-dimensional phase image P is output to the unwrapping step 150 and the mask generating step 130.

In the mask generating step 130, the interference fringe images F from the interferometer 110 and the two-dimensional phase image P from the phase calculating step 120 are received to calculate a mask image. The calculated mask image is output to the wavefront converting step 140 and the unwrapping step 150.

Figure 6:
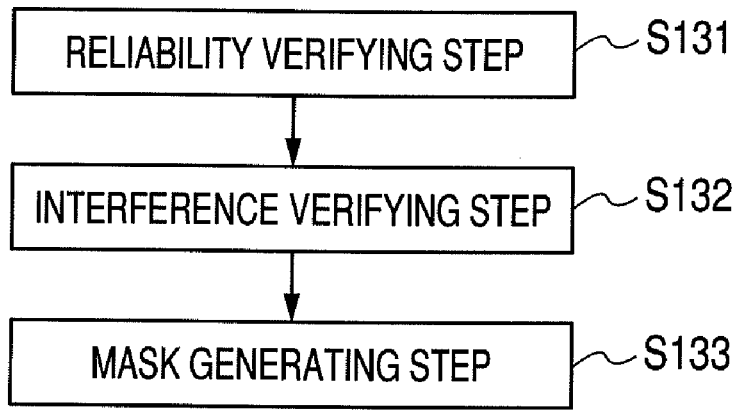
FIG. 6 is a flow chart of a mask generating step in the first embodiment according to the present invention.

As shown in a flow chart of FIG. 6, the process is divided into a reliability verifying step (first extracting step) S131, an interference verifying step (second extracting step) S132, and a mask generating step S133.

In the reliability verifying step (first extracting step) S131, the two-dimensional phase image P calculated in the phase calculating step 120 is received, and an area presumed to be influenced by noise is detected (in other words, a high reliability area presumed not to be influenced by noise is extracted). An example of the detecting method includes the following.

Since the light vector field is a conservative field without eddies, $$\nabla \times d = 0 \qquad \text{Formula 2}$$

can be formed. If Formula 2 is not satisfied, it can be considered that there is an influence of noise, which may affect the unwrapping. Therefore, the area that does not satisfy Formula 2 can be assumed as a low reliability area.

To calculate Formula 1 in a pixel (i, j), $$R = \left[\frac{\varphi(i+1, j)}{2\pi} - \frac{\varphi(i, j)}{2\pi}\right] + \left[\frac{\varphi(i+1, j+1)}{2\pi} - \frac{\varphi(i+1, j)}{2\pi}\right] + \left[\frac{\varphi(i, j+1)}{2\pi} - \frac{\varphi(i+1, j+1)}{2\pi}\right] + \left[\frac{\varphi(i, j)}{2\pi} - \frac{\varphi(i, j+1)}{2\pi}\right] \qquad \text{Formula 3}$$

can be used.

In this case, R is called a residue. A threshold is actually set in Formula 3 to obtain the residue. For example, if R>0.01, a positive-residue exists, and if R<-0.01, a negative-residue exists. If $-0.01 \leq R \leq 0.01$, a zero-residue exists. If a non-zero-residue is detected in the pixel (i, j), the reliability of the value of the pixel (i, j) is determined to be low, and the pixel (i, j) is set to 0. If the reliability is high, the pixel (i, j) is set to 1.

This operation is performed on the entire two-dimensional phase image P to formulate a reliability mask image M1. Thus, a mask is formulated (area with a value smaller than a threshold is masked) based on the difference in values of reliability (difference in interference degree) in the areas. Other than the method described above, an example of the reliability verification method includes a method using derivatives in x and y directions as described in Document 1. In addition, a method of extracting the maximum derivative in specific areas is created. The present embodiment does not limit the reliability verification method, and these methods may also be used.

In the interference verifying step (second extracting step) S132, the interference fringe images F photographed by the interferometer 110 are received, and an area presumed to have low interference is detected (in other words, area presumed to have high interference is extracted). An example of the detecting method includes the following.

The absolute value of the visibility that is a complex coefficient of the interference fringes is calculated. To calculate the visibility, $$V = (F_1 - F_3) + i(F_2 - F_4)$$

can be used. As a result, the value of the visibility in a low interference area becomes small. A threshold is set, and an interference mask image M2 is generated, in which an area having a value smaller than the threshold is 0 and an area having a value greater than or equal to the threshold is 1. Thus, a mask is formulated (area with a value smaller than the threshold is masked) based on the difference in values of visibility (difference in interference degree) in the areas.

In the mask formulating step S133, the reliability mask image M1 calculated in the reliability verifying step S131 and the interference mask image M2 calculated in the interference verifying step S132 are received to combine the two mask images to generate a mask image M. Since the two mask images are data made of 0 and 1, the logical sum is used to obtain a combined mask image in the combining method. Hereinafter, an area with a value 0 in the mask image M will be referred to as a mask area. Obviously, another method (based on another standard) can also be used as the combining method. The reliability mask image M1 calculated in the reliability verifying step S131 may be used as the mask image M without change, or the interference mask image M2 calculated in the interference verifying step S132 may be used as the mask image M without change.

In the wavefront converting step 140, the transmitted wavefront $I_{pre}$ at the second angle calculated in advance and already recorded in the transmitted wavefront recording step 160, the mask image M calculated in the mask generating step 130, and the look-ahead information are used. Based on these, an initial value of the transmitted wavefront in the mask area at the first angle (see FIG. 15C) is calculated.

Figure 7:
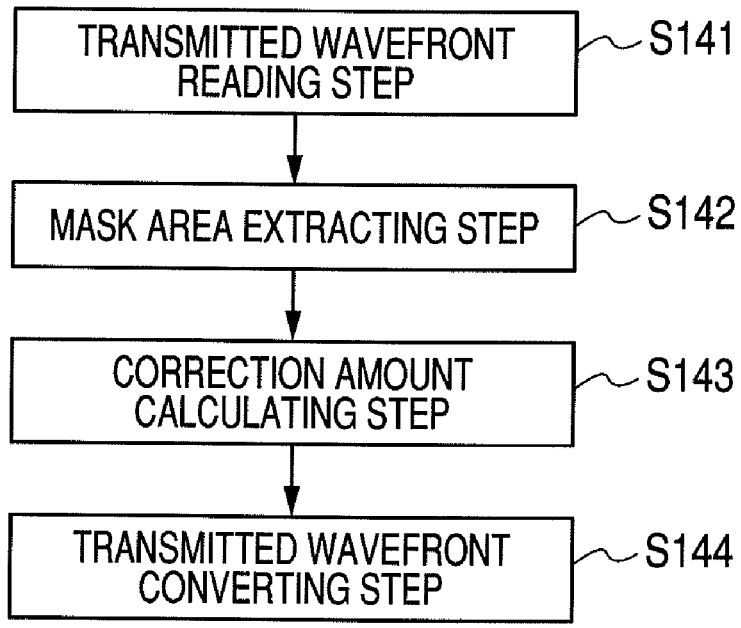
FIG. 7 is a flow chart of a wavefront converting step in the first embodiment of the present invention.

As shown in a flow chart of FIG. 7, the process is divided into a transmitted wavefront reading step (wavefront obtaining step) S141, a mask area extracting step S142, a correction amount calculating step (correction amount obtaining step) S143, and a transmitted wavefront converting step S144.

In the transmitted wavefront reading step S141, the transmitted wavefront $I_{pre}$ at the second angle is read out. The transmitted wavefront $I_{pre}$ at the second angle is calculated before the processing at the first angle and recorded in the wavefront recording step 160.

In the transmitted wavefront recording step 160, a distinct transmitted wavefront $I_{pre}$ at the second angle obtained in advance in the measurement of the transmitted wavefront is recorded.

In the mask area extracting step S142, the mask image M calculated in the mask generating step 130 is used to extract a transmitted wavefront of only a masked area. Since the angle of the transmitted wavefront $I_{pre}$ at the front angle is different, there is a deviation. Therefore, the transmitted wavefront cannot be used as an initial value of the transmitted wavefront at the first angle without change.

Thus, in the correction amount calculating step S143, the look-ahead information is used to calculate the correction amount for adjusting the transmitted wavefront $I_{pre}$ at the second angle to the relevant area to obtain a value close to the transmitted wavefront at the first angle. The second angle, the first angle, and the shape of the inspected substance O can be used as the look-ahead information.

In the method of calculating the correction amount using the look-ahead information, the thickness of the inspected substance O when the inspected substance O is projected from the direction of the front angle and the thickness of the inspected substance O when the inspected substance O is projected at the first angle are calculated first to calculate a changed amount of thickness. The distribution of typical optical path changes may be added to the inspected substance O, and the optical path change in two directions may be calculated to obtain the correction amount of the transmitted wavefront at the first angle. Alternatively, in the correction amount calculating step, data related to the correction amount may be held in advance, and a most suitable correction amount may be extracted (obtained) from the data based on the look-ahead information.

In the transmitted wavefront converting step S144, the correction amount calculated in the correction calculating step S143 is used to convert the mask area of the transmitted wavefront $I_{pre}$ at the front angle extracted in the mask area extracting step S142 to form the transmitted wavefront of the mask area at the first angle.

In the unwrapping step 150, unwrapping is performed based on the two-dimensional phase image P calculated in the phase calculating step 120, the mask image M generated in the mask generating step 130, and the initial value calculated in the wavefront converting step 140 to calculate the transmitted wavefront I.

A weighted least squares method is suitable as the unwrapping method in the present invention. Unwrapping is performed by providing an initial value, a weighting function, and a threshold and performing iterative calculation. The mask image M generated in the mask generating step 130 is used as the weighting function. The initial value is set by unwrapping the two-dimensional phase image P by the least squares method, the initial value of which is obtained in the wavefront converting step 140 as an initial value of the mask area. A transmitted wavefront obtained by another unwrapping method may be used as the initial value.

Another method described in Document 1 can be used as the unwrapping method, and the present embodiment does not limit the unwrapping method.

In the transmitted wavefront recording step 160, the transmitted wavefront I calculated in the unwrapping step 150 is recorded. The interference fringe images F, the two-dimensional phase image P, and the mask image M may also be recorded.

In the present embodiment, the transmitted wavefront I of the inspected substance O is obtained as described above and is displayed on, for example, the display unit 180 to measure the optical characteristics of the inspected substance O.

Second Embodiment

Figure 8:
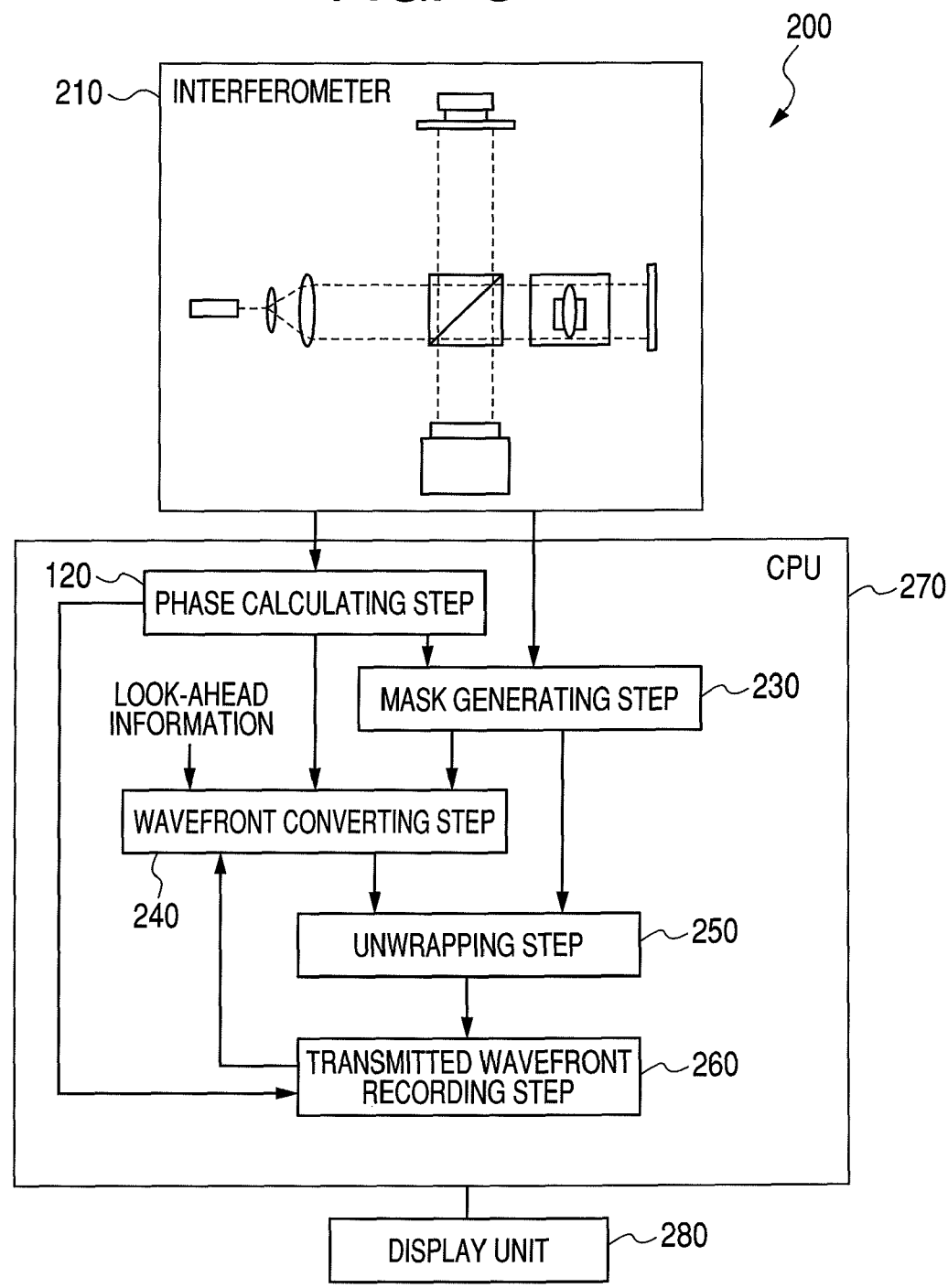
FIG. 8 is an explanatory view of a wavefront measuring method of a second embodiment according to the present invention.

FIG. 8 is a block diagram of main parts of a second embodiment of the present invention. A configuration of an interferometer 210 of the second embodiment is different from the configuration of the interferometer 110 of the first embodiment of FIG. 2. A method for obtaining the transmitted wavefront in a computation apparatus 270 is also different.

The two-dimensional phase image (FIG. 15B) is used in place of the transmitted wavefront at the second angle (FIG. 15C) as data used in a wavefront converting step 240 in the second embodiment.

The second embodiment using the interferometer different from the first embodiment will now be described.

In FIG. 8, a wavefront measuring apparatus 200 using a wavefront measuring method includes the interferometer 210, the computation apparatus 270, and a display unit 280. The computation apparatus 270 includes the phase calculating step 120, a mask generating step 230, a wavefront converting step 240, an unwrapping step 250, and a transmitted wavefront recording step 260.

Figure 9:
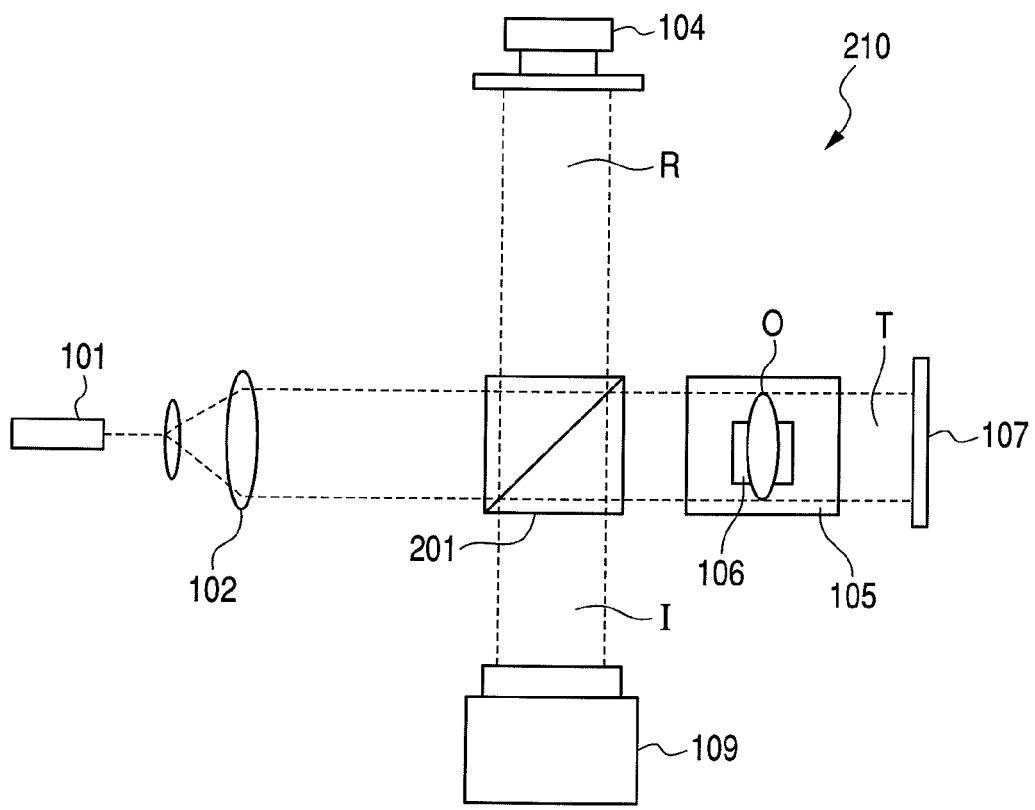
FIG. 9 is an explanatory view of an interferometer used in the second embodiment according to the present invention.

FIG. 9 is a schematic view of main parts of the interferometer 210 of FIG. 8.

The interferometer 210 can observe interference fringes from different light directions relative to the inspected substance O. The interferometer 210 includes the laser light source 101 that emits coherent light, the beam expander 102 that expands the radius of the laser light from the laser light source 101, and a half mirror 201 that splits the light beam from the beam expander 102 into transmitted light and reference light. The interferometer 210 also includes the piezo mirror 104 that changes the optical path length of the reference light in a sub-wavelength order and the matching tank 105 that holds an inspected substance O soaked in a matching solution. The interferometer 210 further includes the stage 106 that fixes the inspected substance O in the matching tank 105 and the mirror 107. The interferometer 210 also includes the image pickup apparatus 109 that superimposes the light from the piezo mirror 104 and the mirror 107 by the half mirror 201 to receive the superimposed light. Although FIG. 8 illustrates the inspected substance O for description, the inspected substance O is not a constituent element of the wavefront measuring apparatus.

In the phase calculating step 120 of FIG. 8, the two-dimensional phase image P is calculated from the interference fringe images F obtained from the interferometer 210 as in the first embodiment. The two-dimensional phase image P calculated in the phase calculating step 120 is output to the wavefront converting step 240, the mask generating step 230, and the transmitted wavefront recording step 260.

In the mask generating step 230, the interference fringe images F are received from the interferometer 210 to calculate the mask image M. The mask image M calculated in the mask generating step 230 is output to the wavefront converting step 240 and the unwrapping step 250.

Figure 10:
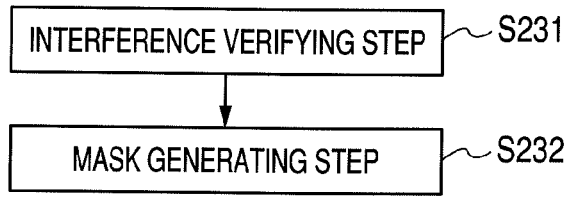
FIG. 10 is a flow chart of a mask generating step in the second embodiment according to the present invention.

FIG. 10 is a flow chart of a process in the mask generating step 230. As shown in FIG. 10, the mask generating step 230 is divided into an interference verifying step S231 and a mask generating step S232.

In the interference verifying step S231, the visibility is calculated from the interference fringe images F as in the first embodiment, and a visibility image V is transferred to the mask generating step S232.

In the mask generating step S232, the visibility image V obtained in the interference verifying step S231 is received to generate a mask image M that is a binary image in which a threshold is set, a low interference area is extracted and set to a zero value, and a high interference area is set to 1. The formulated mask image M is output to the wavefront converting step 240 and the unwrapping step 250.

In the transmitted wavefront recording step 260, a two-dimensional phase image $P_{pre}$ at the second angle obtained at an angle, in which the interference fringes are distinct, is recorded.

The two-dimensional phase image P calculated in the phase calculating step 120, the two-dimensional phase image $P_{pre}$ (see FIG. 15B) at the second angle from the transmitted wavefront recording step 260, the mask image M calculated in the mask generating step 230, and the look-ahead information are used in the wavefront converting step 240. A two-dimensional phase image of the mask area at the first angle is calculated from these.

Figure 11:
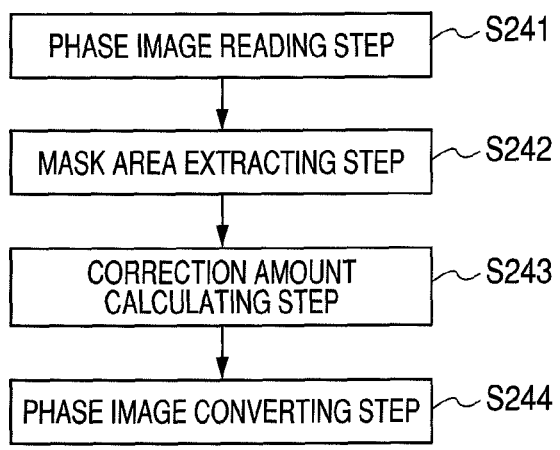
FIG. 11 is a flow chart of a wavefront converting step in the second embodiment according to the present invention.

FIG. 11 is a flow chart of a process in the wavefront converting step 240. As shown in FIG. 11, the wavefront converting step 240 is divided into a phase image reading step (phase obtaining step) S241, a mask area extracting step S242, a correction amount calculating step S243, and a phase image converting step (converting step) S244.

In the phase image reading step S241, a two-dimensional phase image $P_{pre}$ at another angle is read out. To obtain the two-dimensional phase image $P_{pre}$ at the second angle, the interferometer 210 measures the interference fringe images before the process at the first angle, and the two-dimensional phase image P is calculated in the phase calculating step 120. The two-dimensional phase image P is recorded in the transmitted wavefront recording step 260 and is read for use.

In the mask area extracting step S242, the mask image M calculated in the mask generating step 230 is used to extract a two-dimensional phase image of only the masked area.

In the correction amount calculating step S243, a correction amount is calculated from the look-ahead information as shown in the first embodiment to approximate the two-dimensional phase image $P_{pre}$ at the second angle recorded in the transmitted wavefront recording step 260 to the two-dimensional phase image at the first angle.

In the phase image converting step S244, a conversion is made using the correction amount calculated in the correction amount calculating step S243. The two-dimensional phase image has a $2\pi$ irregularity, and the irregularity in the mask area may be deviated. Therefore, a shift is made so that the location of the $2\pi$ irregularity in the two-dimensional phase image at the first angle matches the location of the $2\pi$ irregularity in the two-dimensional phase image at the second angle extracted after conversion. In this way, the $2\pi$ irregularity becomes smooth between the mask area and the area other than the mask.

In the unwrapping step 250, unwrapping is performed based on the mask image M generated in the mask generating step 230 and the two-dimensional phase image calculated in the wavefront converting step 240 to calculate the transmitted wavefront I.

Other than the method described in the first embodiment, a method dependent on the path can be used as the unwrapping method. In the method, irregularities of $2\pi$ or more are sequentially detected from a certain pixel, and an integral multiple of $2\pi$ is added before unwrapping.

In the transmitted wavefront recording step 260, the transmitted wavefront I calculated in the unwrapping step 250 and the two-dimensional phase image P calculated in the phase calculating step 120 are recorded in the same configuration as in the first embodiment. Additionally, the interference fringe images F and the mask image M may also be recorded. The display unit 280 displays the transmitted wavefront obtained by the computation apparatus 270.

Third Embodiment

Figure 12:
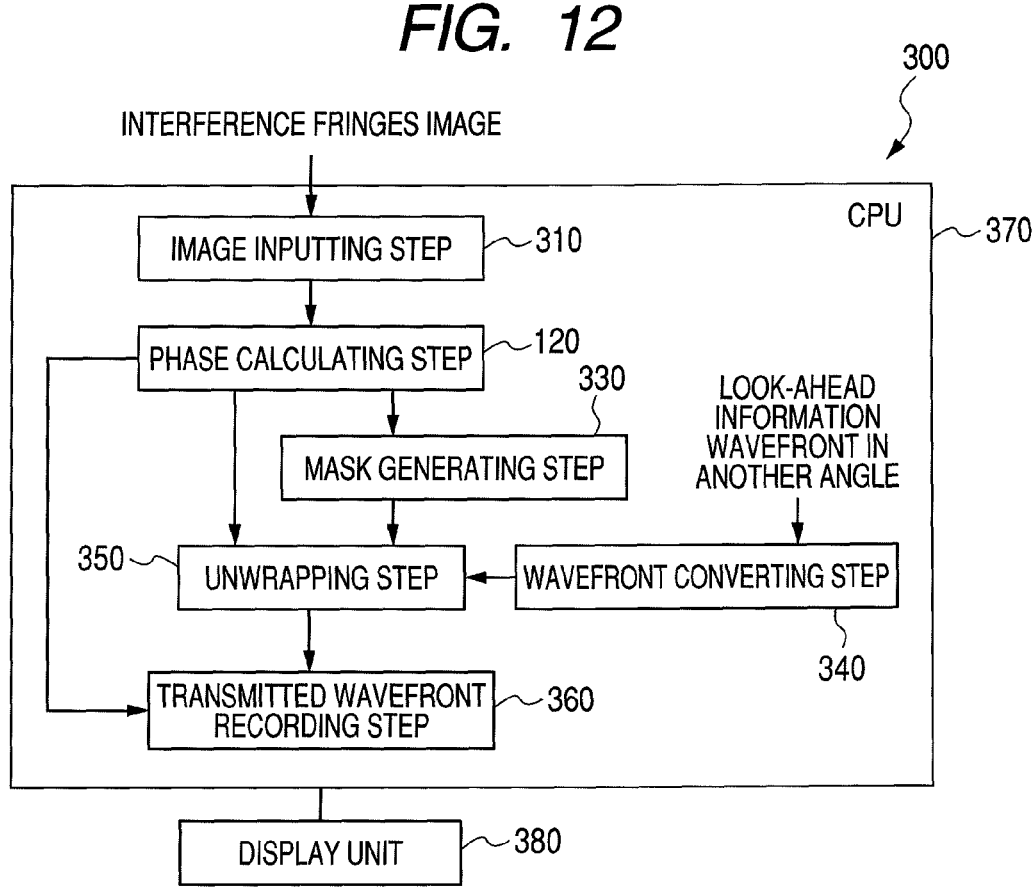
FIG. 12 is an explanatory view of a wavefront measuring method of a third embodiment according to the present invention.

FIG. 12 is a block diagram of main parts of a third embodiment of the present invention. A wavefront measuring apparatus 300 using a wavefront measuring method of the third embodiment does not include an interferometer.

A configuration of the third embodiment not including the interferometer will now be described.

A wavefront measuring apparatus 300 includes a computation apparatus 360 and a display unit 370. The computation apparatus 370 includes an image inputting step 310, the phase calculating step 120, a mask generating step 330, a wavefront converting step 340, an unwrapping step 350, and a transmitted wavefront recording step 360.

In the image inputting step 310, the interference fringe images F acquired by the interferometer and stored in the recording medium, such as a semiconductor memory and a magnetic/optical disk, are read and output to the phase calculating step 120.

In the phase calculating step 120, the two-dimensional phase image P is calculated from the interference fringe images F obtained in the image inputting step 310, as in the first embodiment. The calculated two-dimensional phase image P is output to the mask generating step 330, the unwrapping step 250, and the transmitted wavefront recording step 360.

Figure 13:
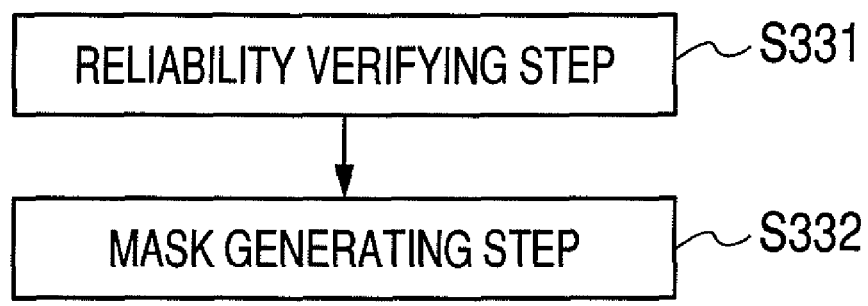
FIG. 13 is a flow chart of a mask generating step in the third embodiment according to the present invention.

In the mask generating step 330, the mask image M is calculated from the two-dimensional phase image P calculated in the phase calculating step 120. The calculated mask image M is output to the unwrapping step 350. FIG. 13 is a flow chart of a process in the mask generating step 330. As shown in FIG. 13, the mask generating step 330 is divided into a reliability verifying step S331 and a mask generating step S332.

In the reliability verifying step S331, the two-dimensional phase image P calculated in the phase calculating step 120 is received as in the first embodiment, an area presumed to be influenced by noise is detected, and the reliability image N is generated and transferred to the mask generating step S332.

In the mask generating step S332, the reliability image N obtained in the reliability verifying step S331 is received to generate the mask image M that is a binary image in which a threshold is set, a low reliability area is extracted and set to a zero value, and a high reliability area is set to 1. The generated mask image M is output to the unwrapping step 350.

Figure 14:
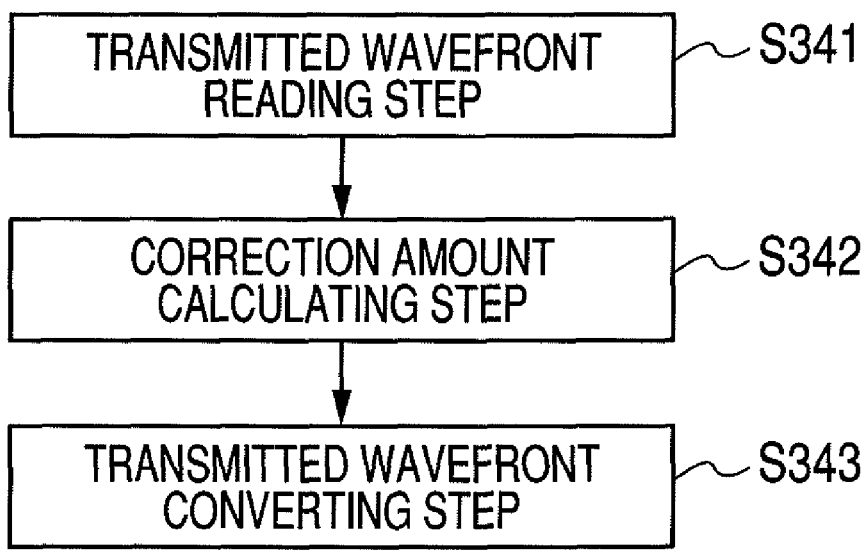
FIG. 14 is a flow chart of a wavefront converting step in the third embodiment according to the present invention.

In the wavefront converting step 340, the transmitted wavefront at the first angle is calculated from the transmitted wavefront $I_{pre}$ at the second angle and the look-ahead information. FIG. 14 is a flow chart of a process of the wavefront converting step 340.

As shown in FIG. 14, the wavefront converting step 340 is divided into a transmitted wavefront reading step S341, a correction amount calculating step S343, and a transmitted wavefront converting step S344.

In the transmitted wavefront reading step S341, a distinct transmitted wavefront $I_{pre}$ at the second angle is read out. The transmitted wavefront $I_{pre}$ at the second angle is calculated before the process at the first angle and is read for use. The transmitted wavefront $I_{pre}$ of the front angle is not limited to the one measured by the present measuring apparatus.

In the correction amount calculating step S342, the correction amount is calculated using the look-ahead information as shown in the first embodiment. Assuming that the rotational axis is perpendicular to the optical axis of the inspected substance and the inspected substance is a convex lens, the width of the projected substance decreases until π/2 rotation and then increases until π rotation when a rotation is made from the front direction.

Therefore, in the calculating method of the correction amount, the shape data of the inspected substance O is first used to compare the projected shape of the inspected substance in the projection from the front angle direction and the projected shape of the inspected substance in the projection from the first angle direction.

After the comparison, how much the width of the projected shape has changed due to the difference in the angle is obtained. A compressed/expanded amount in the width direction for approximating the transmitted wavefront $I_{pre}$ at the front angle to the transmitted wavefront at the first angle is calculated as the correction amount based on the changed amount.

In the transmitted wavefront converting step S343, the correction amount calculated in the correction amount calculating step S342 is used to make a conversion so that the transmitted wavefront $I_{pre}$ at the front angle becomes the transmitted wavefront at the first angle. The converted transmitted wavefront is output to the unwrapping step 350.

In the unwrapping step 350, the two-dimensional phase image P calculated in the phase calculating step 120, the mask image M generated in the mask generating step 330, and the presumed transmitted wavefront calculated in the wavefront converting step 340 are received, unwrapping is performed, and the transmitted wavefront I is calculated. As in the first embodiment, the unwrapping is performed by setting the presumed transmitted wavefront as the initial value, setting the mask image M as the weighting function, and applying the weighted least squares method to the two-dimensional phase image P. The calculated transmitted wavefront I is output to the transmitted wavefront recording step 160.

In the transmitted wavefront recording step 360, the transmitted wavefront I calculated in the unwrapping step 350 and the two-dimensional phase image P are recorded. Additionally, the interference fringe images F and the mask image M may also be recorded.

The transmitted wavefront created by the computation apparatus 360 is displayed on the display unit 380 to observe and evaluate the optical performance of the inspected substance.

As described, according to the wavefront measuring apparatus of the embodiments of the present invention, when an optical element is set as an inspected substance, a wavefront measurement can be performed from a direction in which interference fringes are dense, other than the optical axis, and aberration information from another direction can be obtained.

According to the present embodiments, a transmitted wavefront in an area equivalent to an indistinct area can be accurately calculated even if there is an indistinct area in interference fringes based on a light beam through an inspected substance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-101394, filed Apr. 9, 2008, which is hereby incorporated by reference herein in its entirety.

What is claimed is:

1. A wavefront measuring method comprising:
a first obtaining step for obtaining a first two-dimensional phase image or a first transmitted wavefront based on a transmitted light beam when a light beam is made incident into an inspected substance at a first angle;
a second obtaining step for obtaining a second interference fringe image formed based on a transmitted light beam when a light beam is made incident into the inspected substance at a second angle different from the first angle;
a mask generating step for generating a mask corresponding to an interference degree of the second interference fringe image;
a converting step for converting the first two-dimensional phase image to match with a temporary second two-dimensional phase image obtained based on the second interference fringe image or converting the first transmitted wavefront to match with a temporary second transmitted wavefront obtained based on the second interference fringe image; and
an unwrapping step for unwrapping based on (1) the second interference fringe image, the mask, and the first two-dimensional phase image converted in the converting step, or (2) the second interference fringe image, the mask, and the first transmitted wavefront converted in the converting step, to obtain a second transmitted wavefront by a light beam transmitted through the inspected substance when a light beam is made incident into the inspected substance at the second angle.

2. The method according to claim 1, wherein
the mask generating step comprises:
a first extracting step for extracting a high reliability area from a two-dimensional phase image obtained based on the first interference fringe image or the second interference fringe image; and
a mask generating step for generating the mask using a result of the first extracting step.

3. The method according to claim 1, wherein
the mask generating step comprises:
a second extracting step for extracting a high interference area from a two-dimensional phase image obtained based on the first interference fringe image or the second interference fringe image; and
a mask generating step for generating the mask using a result of the second extracting step.

4. The method according to claim 1, wherein
the mask generating step comprises:
a first extracting step for extracting a high reliability area from a first two-dimensional phase image obtained based on the first interference fringe image or the second interference fringe image;
a second extracting step for extracting a high interference area from a second two-dimensional phase image obtained based on the first interference fringe image or the second interference fringe image; and a mask generating step for generating the mask using results of the first extracting step and the second extracting step.

5. The method according to claim 1, wherein the converting step comprises:
a wavefront obtaining step for obtaining the first transmitted wavefront;
an area extracting step for extracting a partially transmitted wavefront equivalent to the mask from the first transmitted wavefront;
a correction amount obtaining step for obtaining a correction amount for matching the partially transmitted wavefront with a relevant area of the second transmitted wavefront; and
a converting step for converting the partially transmitted wavefront using the correction amount.

6. The method according to claim 1, wherein the converting step comprises:
a phase obtaining step for obtaining a first two-dimensional phase image from the first interference fringe image;
an area extracting step for extracting a partial phase image corresponding to an area arranged with the mask from the first two-dimensional phase image;
a correction amount obtaining step for obtaining a correction amount for matching the partial phase image with a relevant area of a second two-dimensional phase image obtained from the second interference fringe image; and
a converting step for converting the partial phase image using the correction amount.

7. The method according to claim 1, wherein the converting step comprises:
a wavefront obtaining step for obtaining the first transmitted wavefront;
a correction amount obtaining step for obtaining a correction amount for matching the first transmitted wavefront with the temporary second transmitted wavefront; and
a transmitted wavefront converting step for converting the first transmitted wavefront using the correction amount.

8. The method according to claim 1, wherein the unwrapping step
uses the mask and the first transmitted wavefront or the first two-dimensional phase image, converted in the converting step for unwrapping.

9. A non-transitory computer-readable medium storing an execution program for executing the wavefront measuring method according to claim 1.

10. A wavefront measuring apparatus configured to measure a transmitting wavefront of a light beam made incident into the inspected substance at a second angle, the apparatus comprising:
a first obtaining unit which obtains a first two-dimensional phase image or a first transmitted wavefront based on a transmitted light beam when the light beam is made incident into the inspected substance at a first angle;
a second obtaining unit which obtains a second interference fringe image formed based on a transmitted light beam when a light beam is made incident into the inspected substance at the second angle different from the first angle;
a mask generating unit which generates a mask corresponding to an interference degree of the second interference fringe image;
a converting unit which converts the first two-dimensional phase image to match with a temporary second two-dimensional phase image obtained based on the second interference fringe image or converting the first transmitted wavefront to match with a temporary second transmitted wavefront obtained based on the second interference fringe image; and
an unwrapping unit which unwraps based on (1) the second interference fringe image, the mask, and the first two-dimensional phase image converted in the converting unit, or (2) the second interference fringe image, the mask, and the first transmitted wavefront converted by the converting unit, to obtain a second transmitted wavefront by a light beam transmitted through the inspected substance when a light beam is made incident into the inspected substance at the second angle.

* * * * *